United States Patent
Ahn et al.

(10) Patent No.: US 8,945,764 B2
(45) Date of Patent: Feb. 3, 2015

(54) BATTERY PACK OF LARGE CAPACITY

(75) Inventors: Chang Bum Ahn, Daejeon (KR); Hyang Mok Lee, Seoul (KR); Byungjin Choi, Daejeon (KR); Jun Hwan Jang, Seoul (KR); Hyung Ku Yun, Daejeon (KR); Sung-Min Hwang, Seoul (KR); Hyun-Chul Jung, Incheon (KR)

(73) Assignee: LG Chem, Ltd., Seoul (KR)

( * ) Notice: Subject to any disclaimer, the term of this patent is extended or adjusted under 35 U.S.C. 154(b) by 1100 days.

(21) Appl. No.: 12/669,243

(22) PCT Filed: Jul. 19, 2007

(86) PCT No.: PCT/KR2007/003501
§ 371 (c)(1),
(2), (4) Date: Apr. 26, 2010

(87) PCT Pub. No.: WO2009/011470
PCT Pub. Date: Jan. 22, 2009

(65) Prior Publication Data
US 2010/0209768 A1 Aug. 19, 2010

(51) Int. Cl.
*H01M 2/08* (2006.01)
*H01M 2/10* (2006.01)
*H01M 2/02* (2006.01)
*H01M 2/30* (2006.01)

(52) U.S. Cl.
CPC ........ *H01M 2/1066* (2013.01); *H01M 2220/30* (2013.01); *H01M 2/0275* (2013.01); *H01M 2/0287* (2013.01); *H01M 2/30* (2013.01)
USPC ............................ 429/185; 429/163; 429/178

(58) Field of Classification Search
CPC ............ H01M 2/0202–2/0217; H01M 2/0275; H01M 2/0287; H01M 2/1061; H01M 2/1066; H01M 2/30
USPC .................................. 429/162, 163, 178, 185
See application file for complete search history.

(56) References Cited

U.S. PATENT DOCUMENTS

| 6,482,544 B1 | 11/2002 | Shiota et al. | |
| 2004/0115527 A1* | 6/2004 | Hiratsuka et al. | 429/176 |

(Continued)

FOREIGN PATENT DOCUMENTS

| JP | 2004-94633 A | 3/2004 |
| KR | 10-0497147 B1 | 6/2005 |

(Continued)

OTHER PUBLICATIONS

"Cover." Merriam-Webster Online Dictionary. Merriam-Webster. Web. Accessed on: Oct. 2, 2013.*

*Primary Examiner* — Edu E Enin-Okut
(74) *Attorney, Agent, or Firm* — Birch, Stewart, Kolasch & Birch, LLP (57) ABSTRACT

Disclosed herein is a battery pack including a battery cell, having an electrode assembly mounted in a pouch-shaped battery case made of a laminate sheet including a metal layer and a resin layer and is sealed by thermal welding, mounted in a pack case, wherein the pack case includes a frame member constructed in a structure in which a receiving part for receiving the battery cell is open, opposite side sealing portions of the battery cell are mounted to the frame member such that the opposite side sealing portions cover the opposite sides of the frame member, and a sheathing film is applied to the outer surface of the frame member, to which the battery cell is mounted.

9 Claims, 4 Drawing Sheets

(56) References Cited

U.S. PATENT DOCUMENTS

| | | | |
|---|---|---|---|
| 2004/0205959 A1* | 10/2004 | Honda et al. | 29/623.5 |
| 2005/0153194 A1 | 7/2005 | Kimura et al. | |
| 2005/0191549 A1* | 9/2005 | Kang et al. | 429/185 |
| 2006/0093902 A1 | 5/2006 | Lee | |
| 2006/0093908 A1* | 5/2006 | Hwang et al. | 429/185 |
| 2006/0266542 A1* | 11/2006 | Yoon | 174/112 |
| 2007/0231687 A1* | 10/2007 | Kim et al. | 429/208 |

FOREIGN PATENT DOCUMENTS

| | | |
|---|---|---|
| KR | 10-0515571 B1 | 9/2005 |
| KR | 10-0515572 B1 | 9/2005 |
| WO | WO-2006/043760 A1 | 4/2006 |

* cited by examiner

BATTERY PACK OF LARGE CAPACITY

FIELD OF THE INVENTION

The present invention relates to a battery pack of large capacity, and, more particularly, to a battery pack including a battery cell, which has an electrode assembly mounted in a pouch-shaped battery case made of a laminate sheet including a metal layer and a resin layer and is sealed by thermal welding, mounted in a pack case, wherein the pack case includes a frame member constructed in a structure in which a receiving part for receiving the battery cell is open, opposite side sealing portions of the battery cell are mounted to the frame member such that the opposite side sealing portions cover the opposite sides of the frame member, and a sheathing film is applied to the outer surface of the frame member, to which the battery cell is mounted.

BACKGROUND OF THE INVENTION

As mobile devices have been increasingly developed, and the demand of such mobile devices has increased, the demand of secondary batteries has also sharply increased as an energy source for the mobile devices. Among them is a lithium secondary battery having high energy density and high discharge voltage, on which much research has been carried out and which is now commercialized and widely used.

Based on its external shape, the lithium secondary battery may be generally classified as a cylindrical battery, a prismatic battery, or a pouch-shaped battery.

Based on its electrolyte, the lithium secondary battery may be classified as a lithium-ion battery or a lithium-ion polymer battery. As the mobile devices have been miniaturized, the demand of the rectangular battery and the pouch-shaped battery, which have a relatively small thickness, has increased.

Furthermore, based on how the secondary battery is mounted to a case, a battery pack may be generally classified as a hard battery pack or an inner battery pack.

The hard battery pack forms a part of the external appearance of an external device, to which the hard battery pack is mounted. Consequently, the hard battery pack has an advantage in that the hard battery pack can be easily mounted to the external device when in use. However, it is required to design a case based on kinds of corresponding external devices while a battery cell is mounted in the case. As a result, the manufacturing costs of the hard battery pack are high, and, furthermore, the hard battery pack has low compatibility with the external devices.

On the other hand, the inner battery pack is mounted in an external device, and is then hidden by a cover, which forms a part of the external device. As a result, although it is relatively troublesome to mount the inner battery pack in the external device, the inner battery pack has advantages in that it is easy to design the inner battery pack, the manufacturing costs of the inner battery pack are low, and the inner battery pack has high compatibility with the external devices.

The prismatic battery or the pouch-shaped battery is widely used as a battery cell, which is a main body of the inner battery pack. The prismatic battery is a battery having an electrode assembly mounted in a battery container, which is made of aluminum or stainless steel. The pouch-shaped battery is a battery having an electrode assembly mounted in a pouch-shaped battery case, which is made of an aluminum laminate sheet. Recently, the demand of the pouch-shaped battery has increased because the weight of the pouch-shaped battery is small, the costs of the pouch-shaped battery are low, and the pouch-shaped battery can be easily deformed depending upon the capacity and output of the battery pack.

Figure 1:
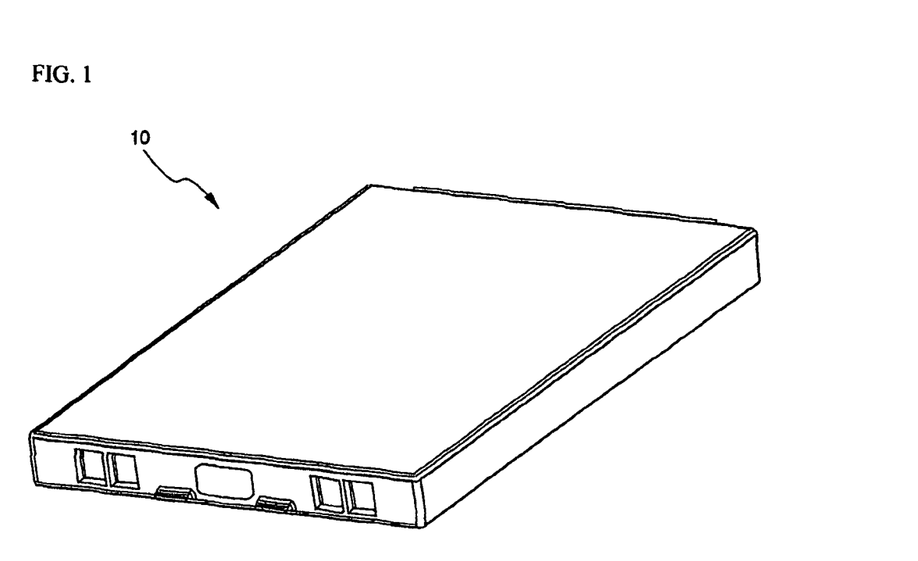
FIG. 1 is a perspective view illustrating a conventional battery pack having a pouch-shaped battery mounted therein.
Figure 2:
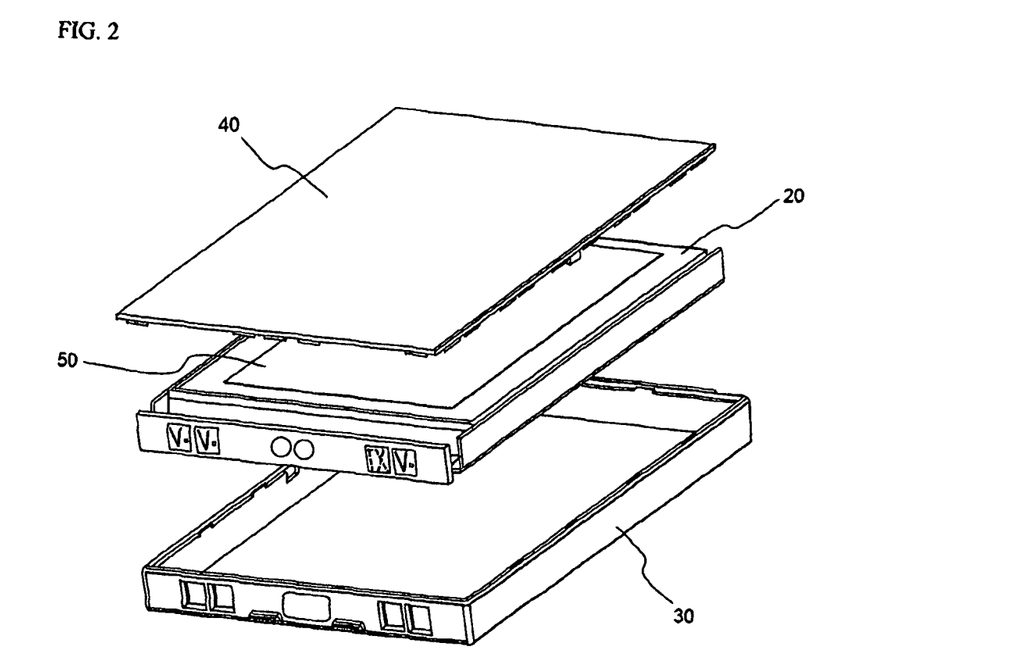
FIG. 2 is an exploded perspective view of the battery pack shown in FIG. 1.

FIGS. 1 and 2 are a perspective view and an exploded perspective view respectively illustrating a conventional inner battery pack including a pouch-shaped battery cell.

Referring to these drawings, the battery pack 10 includes a battery cell 20, in which an electrode assembly including cathodes, anodes, and separators is mounted together with an electrolyte in a sealed state, a pack case body 30 having an inner space for receiving the battery cell 20, and a top cover 40 joined to the top of the pack case body 30, in which the battery cell 20 is received, for sealing the battery cell 20. Between the pack case body 30 and the battery cell 20 and between the top cover 40 and the battery cell 20 are attached double-sided adhesive tapes 50, respectively.

The battery pack cases 30 and 40 supplement the small mechanical strength of the pouch-shaped battery cell 20; however, the battery pack cases 30 and 40 restrict the size of the battery cell 20, with the result that the total capacity of the battery pack is reduced. Furthermore, the pack case body 30 and the top cover 40 are joined to each other by an ultrasonic welding method. Consequently, it is required that the pack case body 30 and the top cover 40 be manufactured with a specific thickness to form the joint interface between the pack case body 30 and the top cover 40, at which the pack case body 30 and the top cover 40 are joined to each other, with the result that the volume of the battery pack is increased.

Recently, therefore, there has been increasingly used a frame-shaped pack case for covering only the side of the battery cell, instead of a box-shaped pack case for covering all the outer surface of the battery cell, to minimize the volume of the battery pack and to effectively supplement the strength of the battery cell. For example, Japanese Patent Application Publication No. 2004-0094633 discloses a battery pack including an integration type pouch-shaped case, which has a first region at which a receiving part for receiving an electrode assembly is formed, a second region extending from the first region such that the second region covers one surface, which is exposed to the outside, of the electrode assembly, and a third region extending from the second region, such that the third region covers the first region and one end of the third region is brought into contact with the second region, and a frame member mounted to the battery cell such that the frame member covers the outer surface of the receiving part before the first region is covered by the third region. In addition, the publication discloses a separation type pouch-shaped case including a first packing member having a receiving part for receiving an electrode assembly and a second packing member having a first region for sealing the first packing member while covering one surface, which is exposed to the outside, of the electrode assembly and a second region extending from the first region such that the second region covers the outer surface of the first packing member.

In the battery pack with the above-stated construction, however, the outermost surface of the battery pack is not covered by an additional sheathing member, with the result that the bent parts and the joint parts of the packing members are exposed to the outside, and therefore, the surface of the battery pack is not smooth. This problem may serve as a main cause of inflicting injury on an engineer or a user and to threaten the security of the engineer or the user during the manufacture or use of the battery pack. In addition, the external appearance of the battery cell, mounted in the battery pack, is maintained by the frame member, and the strength of the battery cell is supplemented by the frame member; however, the top and bottom of the battery cell, which is not protected by the frame member, are covered by only the packing members, which are mechanically weak. Consequently, it is not possible to achieve a desired strength.

On the other hand, various kinds of combustible materials are contained in the lithium secondary battery. As a result, the lithium secondary battery may be heated or explode due to the overcharge of the battery, the overcurrent in the battery, or other physical external impacts. That is, the safety of the lithium secondary battery is very low. Consequently, the lithium secondary battery includes a protection circuit module (PCM), which is connected to the battery cell for effectively controlling an abnormal state of the battery, such as the overcharge of the battery.

Generally, the PCM is connected to the battery cell via conductive nickel plates by welding or soldering. Specifically, the nickel plates are joined to electrode tabs of the PCM by welding or soldering, and then the nickel plates are joined to electrode terminals of the battery cell by welding or soldering. In this way, the PCM is connected to the battery cell to manufacture a battery pack.

In this case, the welding or soldering process must be carried out several times to manufacture the battery pack. The welding or soldering process must be carried out very precisely due to the small structure of the secondary battery, and therefore, a possibility of battery defect is increased. Furthermore, the addition of the above-described process increases the manufacturing costs of products.

Consequently, there is a high necessity for a technology that is capable of fundamentally supplementing the strength of the battery pack, including the pouch-shaped battery cell, effectively increasing the capacity of the battery pack, and easily assembling the battery pack, thereby lowering the manufacturing costs of the battery pack.

SUMMARY OF THE INVENTION

Therefore, the present invention has been made to solve the above-mentioned problems, and other technical problems that have yet to be resolved.

Specifically, it is an object of the present invention to provide a battery pack having a desired strength obtained by a specific coupling structure using a frame member without using a conventional pack sheathing member, such as a box-shaped case, and a relatively large capacity at the same standardization level.

It is another object of the present invention to provide a battery pack that can be manufactured by a simplified assembly process, whereby the manufacturing costs of the battery pack is lowered.

In accordance with the present invention, the above and other objects can be accomplished by the provision of a battery pack including a battery cell, having an electrode assembly mounted in a pouch-shaped battery case made of a laminate sheet including a metal layer and a resin layer and is sealed by thermal welding, mounted in a pack case, wherein the pack case includes a frame member constructed in a structure in which a receiving part for receiving the battery cell is open, opposite side sealing portions of the battery cell are mounted to the frame member such that the opposite side sealing portions cover the opposite sides of the frame member, and a sheathing film is applied to the outer surface of the frame member, to which the battery cell is mounted.

Consequently, the battery pack according to the present invention is constructed without using an additional pack sheathing member, with the result that the assembly process of the battery pack is simplified, the manufacturing costs of the battery pack are reduced, and the battery pack is manufactured in a thinner and more compact structure. Furthermore, the battery is securely disposed in the pack case, and therefore, the battery pack has a high safety against external impact. These characteristics of the present invention are preferably acquired by using a high-strength laminate sheet as the battery case, in which the electrode assembly is mounted, and fixing the frame member, mounted to the battery cell, with the side sealing portions of the battery case.

In a preferred embodiment, the pouch-shaped battery case is made of a high-strength laminate sheet. Preferably, the high-strength laminate sheet includes an outer coating layer of polymer film, a barrier layer of metal foil, and an inner sealant layer of polyolefin. The metal foil of the barrier layer is made of an aluminum alloy, the outer coating layer is made of polyethylene naphthalate (PEN), and/or a layer made of polyethylene terephthalate (PET) is formed at the outer surface of the outer coating layer. The high-strength laminate sheet has a needle piercing force of 6.5 kgf or more. The details of the laminate sheet are disclosed in Korean International Patent Application No. PCT/KR2005/3436, which have been filed in the name of the applicant of the present patent application. The disclosure of the above-mentioned patent publication is hereby incorporated by reference as if fully set forth therein.

The metal foil of the high-strength laminate sheet serves to prevent the introduction or leakage of matter and to improve the strength of the battery case. Consequently, the metal foil provides the laminate sheet with a high strength together with the outer coating layer or the resin layer additionally attached to the outer surface of the outer coating layer.

The needle piercing force means a piercing force measured according to a FTMS 101C method. A conventional laminate sheet type battery case has a needle piercing force of approximately 5.0 kgf. On the other hand, the battery case according to the present invention has a needle piercing force of at least 6.5 kgf, preferably 6.5 to 10.0 kgf, and more preferably 7.0 to 8.5 kgf. The above-specified range of the needle piercing force may be a range to secure the safety of the battery against a possibility of damage to the battery.

The barrier layer, contributing to the increase in strength of the laminate sheet, has a thickness of 20 to 150 µm. When the thickness of the barrier layer is too small, it is difficult to expect the blocking of a piercing object and the improvement of the strength, which is not preferred. When the thickness of the barrier layer is too large, on the other hand, the processability of the barrier layer is decreased, and the thickness of the laminate sheet is increased, which is not preferred.

The aluminum alloy forming the barrier layer may have different strengths depending upon ingredients of the alloy. For example, the aluminum alloy may be, but is not limited to, at least one selected from a group consisting of alloy numbers 8079, 1N30, 8021, 3003, 3004, 3005, 3104, and 3105. Especially, alloy numbers 8079, 1N30, 8021, and 3004 are preferably used as the metal foil of the barrier layer.

Preferably, the polymer film of the outer coating layer has a thickness of 5 to 40 µm. When the thickness of the polymer film is too small, the polymer film does not exhibit a desired strength, which is not preferred. When the thickness of the polymer film is too large, on the other hand, the thickness of the laminate sheet is increased, which is not preferred. According to the present invention, the polymer film of the outer coating layer is selectively made of PEN. When the polymer film of the outer coating layer is not made of PEN, the polymer film of the outer coating layer is preferably made of an oriented nylon film.

When the PET layer is selectively attached to the outer surface of the outer coating layer, the PET layer preferably has a thickness of 5 to 30 μm. When the thickness of the PET layer is too small, it is not difficult to expect the improvement of the strength due to the addition of the PET layer, which is not preferred. When the thickness of the PET layer is too large, on the other hand, the thickness of the laminate sheet is increased, which is not preferred.

Although the use of the PEN film as the outer coating layer and the addition of the PET layer to the outer surface of the outer coating layer are selectable, it is required to acquire the needle piercing force by the selection of at least one from the two. Of course, the strength of the laminate sheet may be further increased through the simultaneous use of the two.

Preferably, the inner sealant layer is made of clarified polypropylene (CPP) film, and has a thickness of 30 to 50 μm.

The laminate sheet having the above-described structure exhibits a very high strength, and therefore, the laminate sheet itself provides mechanical properties required for the battery pack, such as high tensile strength, high impact strength, and high durability, without using an additional pack sheathing member.

The laminate sheet may be manufactured in various manners. For example, the films and the metal foil forming the respective layers may be sequentially stacked and then bonded to each other. The bonding may be accomplished by a dry lamination method or an extrusion lamination method. The dry lamination method is a method of drying an adhesive, while the adhesive is disposed between one material and another material, applying a predetermined temperature, higher than the room temperature, and a predetermined pressure to the two materials using a heating roll to join the two materials to each other. On the other hand, the extrusion lamination method is a method of interposing an adhesive between one material and another material and applying a predetermined pressure to the two materials at the room temperature using a pressing roll.

In the battery pack according to the present invention, the sheathing film may be made of, for example, a polymer resin material, such as polyethylene (PE), polypropylene (PP), or polyethylene terephthalate (PET), or a thin metal material. Preferably, the sheathing film is made of the polymer resin material. The preferable thickness of the film is approximately 0.05 to 0.3 mm, in consideration of the thickness of the battery pack and the function of the film as a protecting member; however, the thickness of the film is not limited to the above-specified value.

The sheathing film serves to maintain the fixation of the battery cell to the frame member and to protect the battery cell from the outside. Furthermore, the sheathing film serves as a label for displaying the construction of the battery pack, how to use the battery pack, and the origin of the battery pack.

According to circumstances, the sheathing film may be made of high-strength film, and may be constructed in the same structure as the high-strength laminate sheet, which was previously described. In this case, the pouch-shaped battery case may be made of an aluminum laminate sheet.

As previously described, the pouch-shaped battery case and/or the sheathing film may be made of a high-strength material to improve the strength of the battery pack. For example, when the pouch-shaped battery case is made of high-strength laminate, the sheathing film may be a conventional sheathing film which is generally used. When the sheathing film is made of high-strength film, on the other hand, the pouch-shaped battery case may be a conventional pouch-shaped battery case which is generally used. Of course, both the pouch-shaped battery case and the sheathing film may be made of a high-strength material.

According to the present invention, the pack case is constructed in the form of a frame member having an inner space for receiving the battery while covering only the side of the battery.

In a preferred embodiment, the frame member is provided at the inside upper end thereof with a protection circuit module (PCM) formed in the shape corresponding to the upper end of the frame member. The inside upper end of the frame member is a region corresponding to electrode terminals of the battery cell when the frame member is mounted to the battery cell. The PCM, which is formed at the inside upper end of the frame member, is brought into contact with the electrode terminals of the battery cell simultaneously when the frame member is coupled to the battery cell.

In the above-described structure, the frame member may be provided at the front thereof with openings, through which external input and output terminals are exposed to the outside, and the PCM, which is mounted to the frame member, may be provided at the upper end thereof with connecting terminals. Specifically, an upper end sealing portion of the battery cell is vertically bent, and then the electrode terminals of the battery cell are horizontally bent, whereby the electrode terminals of the battery cell are directly connected to the connecting terminals, which are formed at the upper end of the PCM. At this time, the connecting terminals of the PCM and the electrode terminals of the battery cell may be connected to each other by simply mounting the frame member to the battery cell without an additional connecting process, such as welding. Also, the external input and output terminals of the PCM, electrically connected to the battery cell, may be exposed through the openings.

In conclusion, the openings of the frame member are formed at the front of the frame member, the connecting terminals of the PCM are formed at the upper end of the PCM, the external input and output terminals of the PCM are exposed to the outside through the openings. Consequently, the electrical connection and assembly process is completed simply by bending the electrode terminals of the battery cell into a predetermined shape and mounting the battery cell to the frame member.

The frame member may be manufactured in an integrated structure including the PCM in the inside upper end of the frame member, for example, by an insert injection molding.

According to the present invention, the front of the frame member is the end region where the sheathing film is not applied. Preferably, the front of the frame member is the outside surface of the upper end where the PCM is mounted. The upper end of the PCM is one of the surfaces open while not in contact with the frame member and the battery cell.

The material for the pack case is not particularly restricted so long as the pack case is made of a material that is capable of protecting the battery mounted in the pack case. For example, the pack case may be made of a polymer resin material, such as polycarbonate (PC) or polyacrylonitrile-butadiene-styrene (ABS), or a metal material, such as stainless steel (SUS).

The electrode assembly is not particularly restricted so long as the electrode assembly is constructed in a structure in which pluralities of electrode tabs are connected to constitute cathodes and anodes. Preferably, the electrode assembly is constructed in a stacking or stacking/folding structure. The stacking type electrode assembly is well known in the art to which the present invention pertains, and therefore, a detailed description of the stacking type electrode assembly will not be given. The details of the stacking/folding type electrode assembly are disclosed in Korean Patent Application Publication No. 2001-0082058, No. 2001-0082059, and No. 2001-

0082060, which have been filed in the name of the applicant of the present patent application. The disclosures of the above-mentioned patent publications are hereby incorporated by reference as if fully set forth therein.

In a preferred embodiment, the electrode assembly is provided at opposite major surfaces thereof with a safety member. For example, the safety member includes a metal sheet electrically connected to the cathode terminal (sheet A), a metal sheet electrically connected to the anode terminal (sheet B), and an insulative sheet disposed between the two metal sheets.

The two metal sheets of the safety member may be made of the same material as current collectors constituting the cathodes and anodes of the electrode assembly. For example, sheet A may be made of aluminum foil having no active material applied thereto, and sheet B may be made of copper foil having no active material applied thereto. Consequently, when a needle-shaped object presses against the electrode assembly or penetrates the electrode assembly, the metal sheets of the safety member according to the present invention, which have no active material applied thereto and are electrically connected to the cathode terminal and the anode terminal, are brought into contact with each other first to induce a micro short circuit, thereby improving the safety of the battery.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF PREFERRED EMBODIMENTS

Now, a preferred embodiment of the present invention will be described in detail with reference to the accompanying drawings. It should be noted, however, that the scope of the present invention is not limited by the illustrated embodiment.

Figure 3:
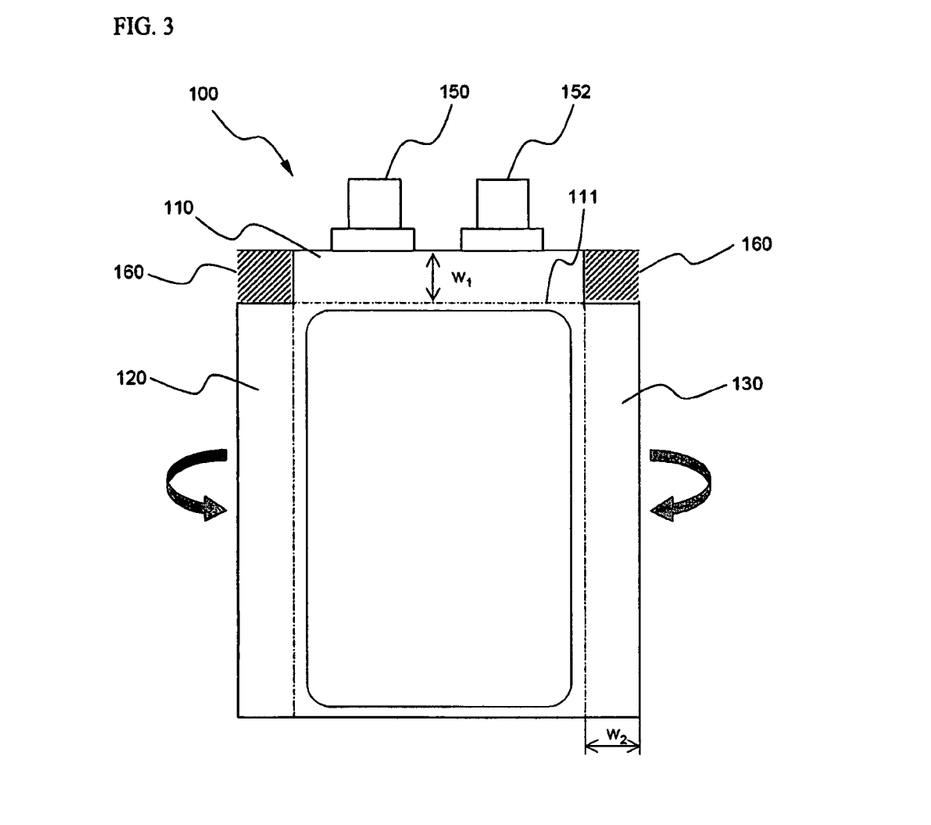
FIG. 3 is a front view illustrating an exemplary pouch-shaped battery that is preferably usable in a battery pack according to a preferred embodiment of the present invention.

FIG. 3 is a front view illustrating an exemplary pouch-shaped battery that is preferably usable in a battery pack according to a preferred embodiment of the present invention. The pouch-shaped battery of FIG. 3 is approximately identical to the conventional pouch-shaped battery, which is being generally used, and therefore, only the characteristics of the present invention will be described hereinafter.

Figure 4:
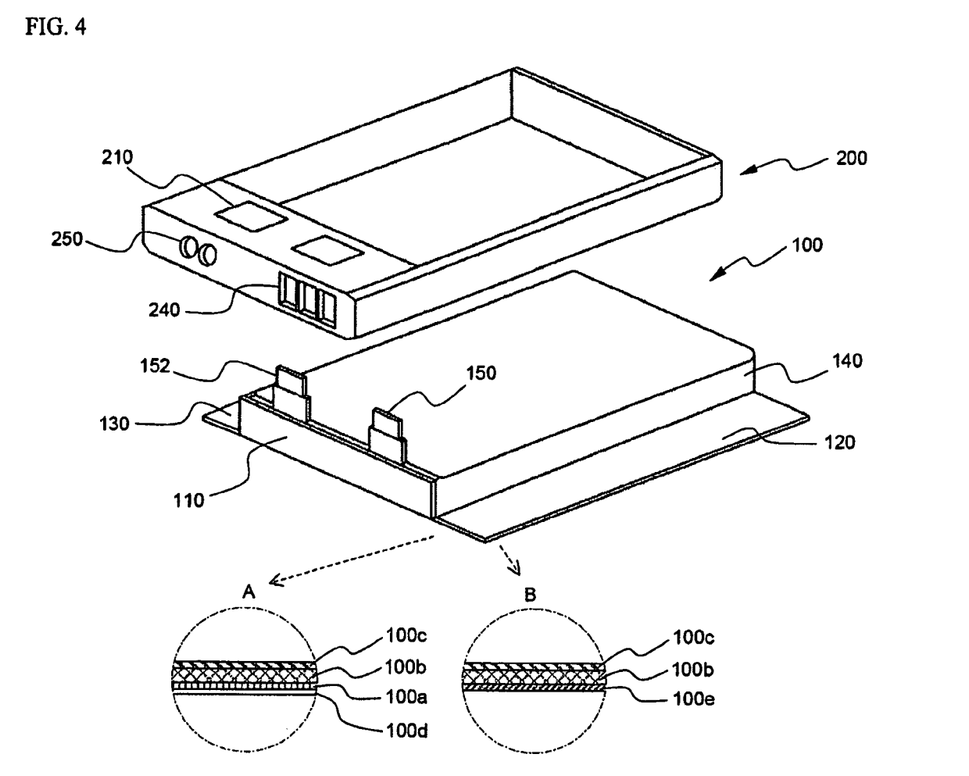
FIGS. 4 to 6 are perspective views typically illustrating a process for manufacturing a battery pack according to a preferred embodiment of the present invention using the battery shown in FIG. 3.

When the upper end and opposite sides of the pouch-shaped battery 100, while an electrode assembly is mounted in a battery case of the pouch-shaped battery 100, sealing portions 110, 120, and 130 are formed at the upper end and opposite sides of the pouch-shaped battery 100. According to the present invention, the upper end sealing portion 110 is vertically bent toward a receiving part 140, which receives the electrode assembly, along a dashed dotted line before a frame member is mounted to the battery cell 100. FIG. 4 is a perspective view of the battery cell 100 bent as described above.

Referring to FIG. 4, the battery case is constructed in two stacking structures. The first stacking structure A includes an outer coating layer 100a made of oriented nylon film (ONy), a barrier layer 100b made of an aluminum alloy, an inner sealant layer 100c made of clarified polypropylene (CPP), and an outermost layer 100d made of polyethylene terephthalate (PET), the outermost layer is coated on the outer surface of the outer coating layer 100a. The second stacking structure B includes an outer coating layer 100e made of polyethylene naphthalate (PEN), a barrier layer 100b made of an aluminum alloy, and an inner sealant layer 100c made of CPP. When the battery case is thermally welded, the inner sealant layer 100c of the case body and the inner sealant layer 100c of the cover are welded to each other to form the sealing portions.

Referring back to FIG. 3, the side sealing portions 120 and 130 are vertically bent in the directions indicated by arrows, after the battery cell 100 is mounted to the frame member 200, in order to increase the coupling force between the battery cell 100 and the frame member 200. Specifically, the side sealing portions 120 and 130 cover the frame member 200, and therefore, the coupling of the battery cell 100 to the frame member is accomplished.

Figure 5:
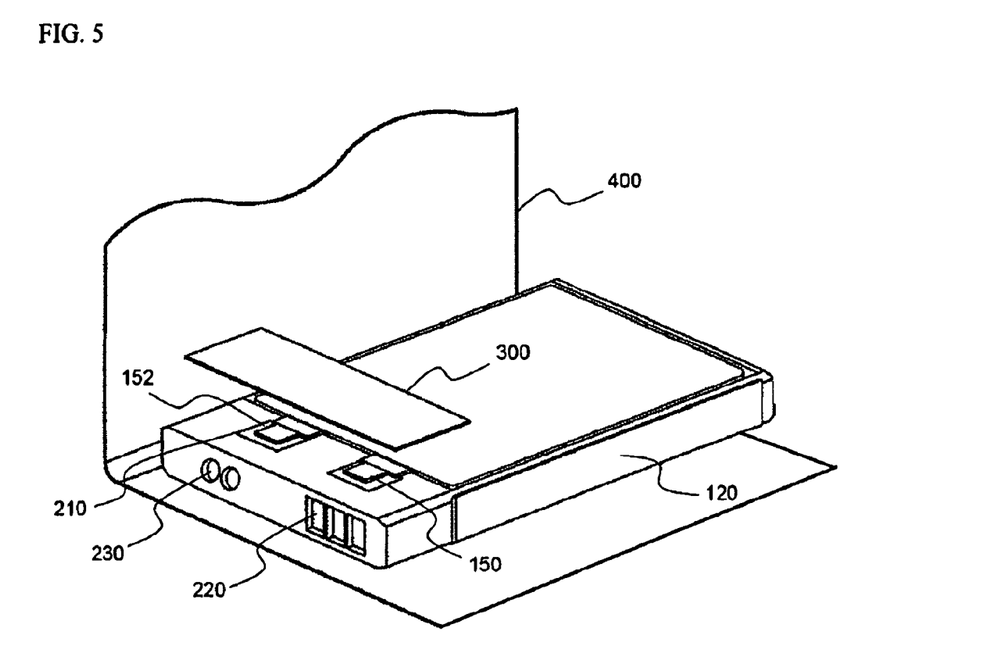

The upper end sealing portion 110 is vertically bent, as shown in FIG. 4, and is then horizontally bent, as shown in FIG. 5. In order to easily perform the bending process, therefore, intersections 160 between the upper end sealing portion 110 and the side sealing portions 120 and 130 are cut off. The cut-off size of the intersections 160 may be decided within a range not to decrease the sealability of the electrode assembly.

Preferably, the upper end sealing portion 110 has a width $w_1$ equal to or greater than the height h of the receiving part 140. Also, the side sealing portions 120 and 130 are vertically bent to cover the frame member 200, as shown in FIG. 5. Consequently, it is preferable to form the side sealing portions 120 and 130 such that the side sealing portions 120 and 130 has a width $w_2$ greater, for example by the thickness of the frame member 200, than that of a conventional pouch-shaped battery.

Figure 6:
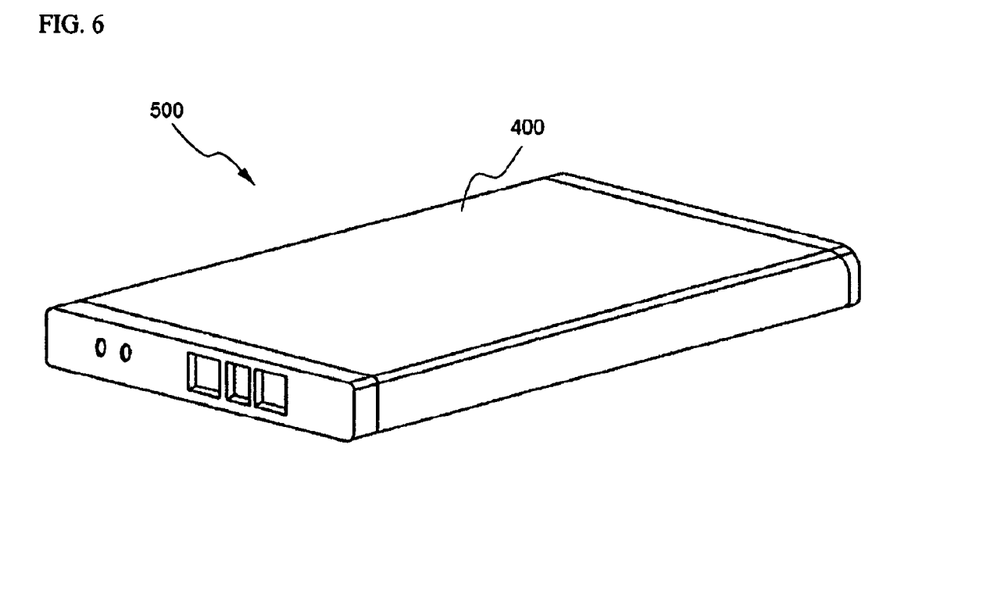

FIGS. 4 to 6 are perspective views typically illustrating a process for manufacturing a battery pack according to a preferred embodiment of the present invention using the battery shown in FIG. 3.

Referring to these drawings, the battery pack 500 may be manufactured by fitting the battery cell 100, the upper end sealing portion of which is bent vertically upward, into the frame member 200, which is constructed in a structure to cover the outside surface of the receiving part 140 while the frame member 200 is open at the top and bottom thereof, bending electrode terminals 150 and 152 protruding from the upper end sealing portion 110 horizontally downward such that the electrode terminals 150 and 152 are brought into contact with connecting terminals 210 of the frame member 200, bending the opposite side sealing portions 120 and 130 vertically upward such that the opposite side sealing portions 120 and 130 cover the frame member 200, attaching an insulative film 300 to a region where the electrode terminals 150 and 152 of the battery cell 100 are connected to the connecting terminals 210 of the frame member 200, applying a sheathing film 400 to the outer surfaces of the battery cell 100 and the frame member 200 such that the sheathing film 400 covers the battery cell 100 and the frame member 200. The electrode terminals 150 and 152 of the upper end sealing portion 110 may be bent after the opposite side sealing portions 120 and 130 are bent.

The opposite side sealing portions 120 and 130 of the battery cell 100 are bent after the frame member 200 is mounted to the battery cell 100. Consequently, when the frame member 200 is mounted to the battery cell 100, the opposite side sealing portions 120 and 130 of the battery cell 100 are disposed while the opposite side sealing portions 120 and 130 of the battery cell 100 extends from the lower end of the outside of the receiving part 140. Therefore, the frame member 200 is fitted on the battery cell 100 downward from above, and is then located on the opposite side sealing portions 120 and 130 of the battery cell 100.

The frame member 200 is provided at the inside upper end thereof with a PCM (not shown). Also, the frame member 200 has windows 240, through which external input and output terminals 220 are exposed to the outside, and holes 250, through which test points 230 are exposed to the outside. The connecting terminals 210, which are connected to the PCM, are formed at the upper end of the frame member 200. When the electrode terminals 150 and 152 of the battery cell 100 are horizontally bent, as shown in FIG. 6, the electrode terminals 150 and 152 are connected to the connecting terminals 210 of the frame member 200. Consequently, the provision of connecting members, such as nickel plates, for interconnecting the electrode terminals 150 and 152 and the connecting terminals 210, is unnecessary, and an additional process, such as welding or soldering, to perform the connection between the electrode terminals 150 and 152 and the connecting members and between the connecting terminals 210 and the connecting members may be omitted. Of course, the welding or soldering process may be carried out to secure the stable connection between the connecting terminals 210 and the electrode terminals 150 and 152. However, the welding or soldering between the connecting terminals 210 and the electrode terminals 150 and 152 is much simpler than the welding or soldering between the electrode terminals 150 and 152 and the connecting members and between the connecting terminals 210 and the connecting members.

The sheathing film 400 is applied to cover the outer surfaces of the battery cell 100 and the frame member 200, excluding the top of the frame member 200, at which the external input and output terminals 200 of the PCM and the test points 230 are formed, and the bottom of the frame member 200 opposite to the top of the frame member. The sheathing film 400 further increases the coupling force between the battery cell 100 and the frame member 200, prevent the introduction of foreign matter through a plurality of gaps existing in the battery cell 100, for example, gaps defined between the side sealing portions 120 and 130 and the frame member 200, and protects the connecting terminals 210 of the PCM and the electrode terminals 150 and 152 of the battery cell 100 together with the insulative film 300.

Through the above-described assembly process, a compact and slim type small-sized battery pack is completed.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

Industrial Applicability

As apparent from the above description, the battery pack according to the present invention has a desired strength and a relatively large capacity at the same standardization level. Furthermore, the battery pack is manufactured by a simplified assembly process, whereby the manufacturing costs of the battery pack is lowered.

What is claimed is:

1. A battery pack including a battery cell, having an electrode assembly mounted in a pouch-shaped battery case made of a laminate sheet including a metal layer and a resin layer and is sealed by thermal welding, mounted in a pack case, wherein
an upper end sealing portion and opposite side portions are vertically bent toward a receiving part for receiving the electrode assembly of the pouch-shaped battery case, respectively,
the pack case includes a frame member constructed in a structure in which a receiving part for receiving the battery cell is open, opposite side sealing portions of the battery cell are mounted to the frame member such that the opposite side sealing portions cover the opposite sides of the frame member and the frame member is located between the electrode assembly and the opposite side sealing portions,
the upper end sealing portion having a width equal to or greater than the height of the receiving part is positioned between the electrode assembly and the frame,
a sheathing film is applied to the outer surface of the frame member, to which the battery cell is mounted,
the frame member is provided at the inside upper end thereof with a protection circuit module (PCM) formed in the shape corresponding to the upper end of the frame member, and
the frame member is provided at the front thereof with openings, through which external input and output terminals are exposed to the outside, the PCM is provided at the upper end thereof with connecting terminals while the PCM is mounted to the frame member, and the upper end sealing portion of the battery cell is vertically bent, and then electrode terminals of the battery cell are horizontally bent, whereby the electrode terminals of the battery cell are electrically connected to the connecting terminals of the PCM in the state of an end of the electrode terminals are exposed to the outside of the frame member for connecting to the connecting terminals.

2. The battery pack according to claim 1, wherein the laminate sheet includes an outer coating layer of polymer film, a barrier layer of metal foil, and an inner sealant layer of polyolefin, the metal foil of the barrier layer is made of an aluminum alloy, (i) the outer coating layer comprises polyethylene naphthalate (PEN), (ii) a layer made of polyethylene terephthalate (PET) is formed at the outer surface of the outer coating layer or (iii) the outer coating layer is made of polyethylene naphthalate (PEN) and the layer made of polyethylene terephthalate (PET) is formed at the outer surface of the outer coating layer, the laminate sheet having a needle piercing force of 6.5 kgf or more.

3. The battery pack according to claim 2, wherein the barrier layer has a thickness of 20 to 150 μm.

4. The battery pack according to claim 2, wherein the aluminum alloy is at least one selected from a group consisting of alloy numbers 8079, 1N30, 8021, 3003, 3004, 3005, 3104, and 3105.

5. The battery pack according to claim 2, wherein the outer coating layer has a thickness of 5 to 40 μm.

6. The battery pack according to claim 2, wherein the polymer film of the outer coating layer is made of PEN, and, when the polymer film of the outer coating layer is not made of PEN, the polymer film of the outer coating layer is made of an oriented nylon film.

7. The battery pack according to claim 1, wherein the sheathing film is a laminate sheet.

8. The battery pack according to claim 1, wherein the frame member and the PCM are integrally formed by insert injection molding.

9. The battery pack according to claim 1, wherein the electrode assembly is a stacking or stacking/folding type electrode assembly, and the electrode assembly is provided at opposite major surfaces thereof with a safety member.

* * * * *